Patented June 27, 1944

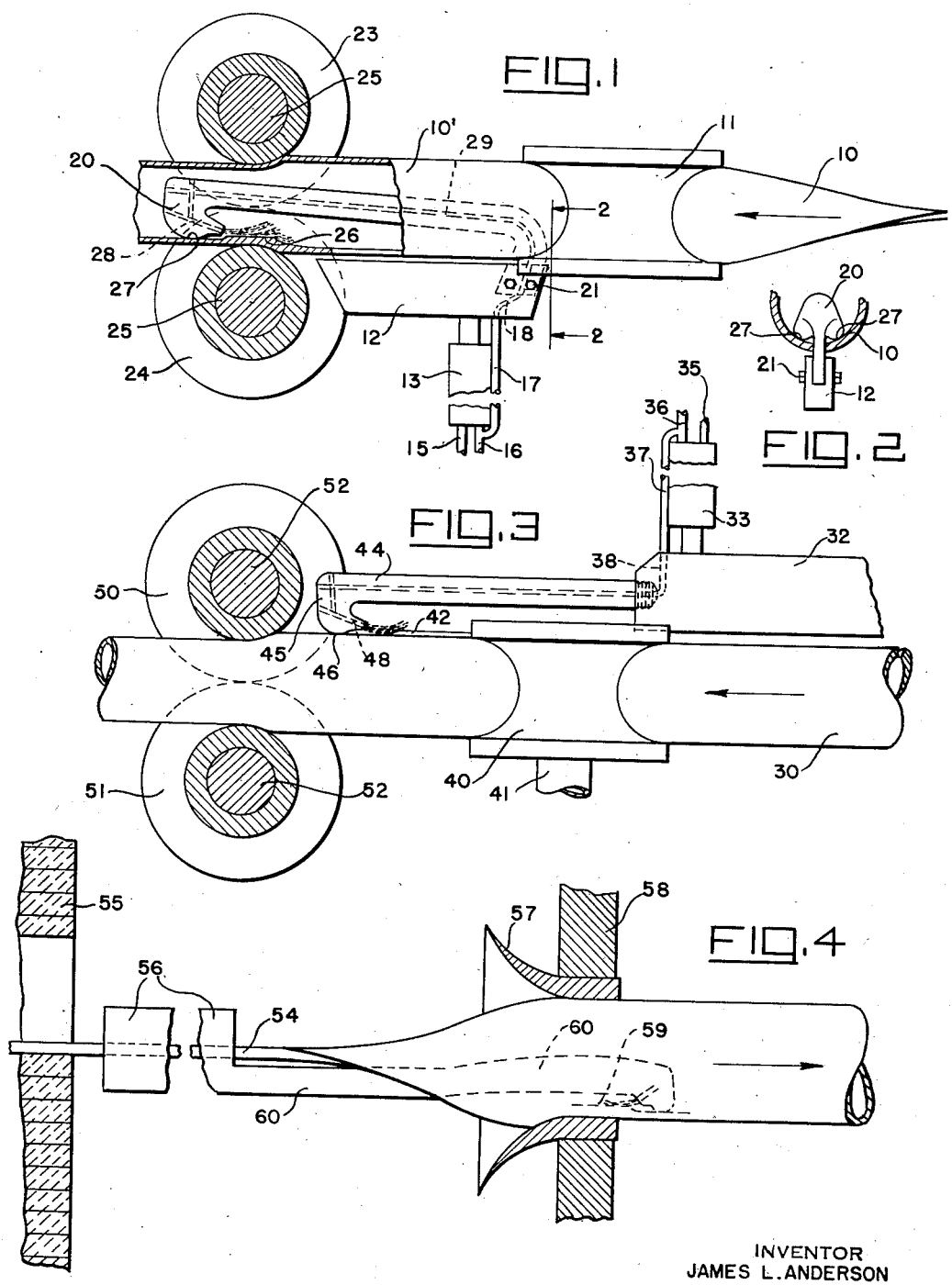

2,352,306

UNITED STATES PATENT OFFICE 2,352,306

TUBE WELDING AND SMOOTHING

James L. Anderson, Closter, N. J., assignor to Air Reduction Company, Incorporated, New York, N. Y., a corporation of New York Application April 22, 1942, Serial No. 440,051

6 Claims. (Cl. 29—33)

This invention relates to tube welding and the removal of flash from the welded seams.

It is an object of the invention to provide an improved method and apparatus for progressively removing flash along a welded seam as a concurrent operation with the welding. In accordance with one feature of the invention, the flash is scarfed at a point so close to the welding region that the metal extruded from the seam is still hot and above its kindling temperature.

One advantage of the invention is that it removes flash while still at a high temperature. Where mechanical cutting tools have been used for the purpose it is necessary for the metal to cool to a temperature low enough for cutting. With high speed welding this cooling time requires a location of the cutting tool beyond the welding rolls.

Another advantage of the invention is that it obviates the necessity of changing tools and regrinding worn tools. The oxygen scarfing jet employed with this invention leaves the seam smooth enough for subsequent drawing operations, and when the scarfing is done on the inside of a seam the residue is loose and falls out when the tube is turned on end.

Another object of the invention is to provide more simple and efficient apparatus for scarfing the flash along a welded seam. The invention includes an attachment for an oxy-fuel gas torch, and the attachment may be connected with the source of oxygen which supplies the torch.

The invention is not limited to torch welding but may be used with any welding process where metal is squeezed from between the welding edges to form a flash, and with any kind of heating that fuses the seam edges.

Other objects, features and advantages of the invention will appear or be pointed out as the specification proceeds.

In the accompanying drawing, forming a part hereof:

Fig. 1 is a side elevation, partly in section, of forming and welding apparatus for making welded tubing and removing an inside flash with a scarfing jet in accordance with this invention.

Fig. 2 is a section on the line 2—2 of Fig. 1.

Fig. 3 is a side elevation, partly in section, showing a modified form of the invention and the removal of an outside flash with the oxygen scarfing jet.

Fig. 4 is a vertical sectional view illustrating another modification of the invention with the welding of skelp in a stationary die or bell.

Fig. 1 shows a skelp 10 which is progressively formed into an open-seam tube 10' by forming rolls 11 between which the skelp is pulled or otherwise propelled with continuous motion. The skelp is formed with the edges underneath and the open seam travels past a multi-jet tip 12 of a heating torch that fuses the edges.

The tip 12 is supported by a stock 13 through which oxygen and fuel gas are supplied to the tip. Fuel gas comes to the stock 13 through a pipe 15, and oxygen through a pipe 16. A branch 17 from the pipe 16 supplies oxygen to a passage 18 in the tip 12.

A scarfing device 20 is connected to the forward end of the tip 12. The scarfing device may be integral with the tip but is preferably an attachment that is fastened to the tip by screws 21. The scarfing device is of narrow width in the region where it connects with the tip 12 and serves as a seam guide for controlling the spacing of the seam edges and for keeping them in position over the torch tip 12, as shown in Fig. 2.

A welding roll stand, including an upper roll 23 (Fig. 1) and lower roll 24, is located just beyond the rearward end of the tip 12. These welding rolls turn on horizontal axles 25 and the pass between the rolls has a circumference somewhat less than the width of the skelp 10 so that the seam edges are brought together in the bite of the welding rolls and at least some of the molten metal is squeezed out of the seam and forms a flash 26. Since the outside of the seam is rolled by the lower welding roll 24, the flash 26 is all on the inside of the tube.

The scarfing device 20 extends rearwardly and has a head located on the tube beyond the region of welding. The head of the scarfing device 20 has a bearing surface 27 that rests on the bottom of the tube and provides a support for the rearward end of the scarfing device. The scarfing device is supported from the tip 12 at its forward end and can be supported entirely from the forward end if the connection with the tip is made strong enough to support the scarfing device as a cantilever load. The preferred embodiments of the invention utilize the supporting bearing surface 27. Although the load on the surface 27 is not severe, this surface is preferably hardened or coated with hard surfacing material that resists wear even when hot.

A jet orifice 28 in the head of the scarfing device is disposed to project an oxygen stream against the flash 26 so close to the region of the welding that the flash is still at a temperature above its kindling point. This scarfing jet orifice 28 is in a plane extending in the direction of the seam length and the orifice 28 extends at an angle of about 20° to the vertical. A passage 29 connects the passage 18 of the torch tip with the scarfing jet orifice 28.

Fig. 3 shows an open-seam tube 30 with the seam at the top of the tube. A multi-jet tip 32 progressively fuses the seam edges as they travel past the tip with continuous motion.

The tip 32 is supported by a stock 33 through which oxygen and fuel gas are supplied to the tip. Fuel gas comes to the stock through a pipe 35, and oxygen through a pipe 36. A branch 37 from the pipe 36 supplies oxygen to a passage 38 in the tip 32.

After the seam edges have been fused by the tip 32 they are brought into contact by welding rolls 40 which turn on vertical axles 41. There are two welding rolls 40 and the pass between them is of such size that it forces the seam edges together with sufficient pressure to squeeze out from between the edges at least a portion of the molten metal. The squeezed-out metal forms a flash 42 which is entirely on the outside of the tube when using skelp that forms a V seam cleft. With such open-seam stock, the bottom portions of the edge faces come together first and the displacement of any molten metal as the edge faces are crowded closer is upward and outward.

The scarfing device shown in Fig. 3 has a stem portion 44 that screws into a socket in the rearward end of the tip 32. The passage 38 opens into the end of this socket and supplies oxygen to the hollow interior of the stem portion 44. At the rearward end of the stem portion 44 there is a head 45 with a bearing surface 46 that rests on the surface of the tube and that may be of hard material.

A jet orifice 48 opening through a face of the head 45 of the scarfing device communicates through a connecting passage with the hollow interior of the stem portion 44 and thereby receives oxygen from the passage 38 and branch pipe 37. The scarfing devices of both Figs. 1 and 3 can be designed for direct connection with the branch pipes 17 and 37, instead of using the special conduits in the tips.

The jet orifice 48 is in position to project an oxygen scarfing jet against the flash 42 at a point beyond the region of welding but close enough to that region for the metal of the flash to be still at an elevated temperature above the kindling temperature of the metal so that the scarfing jet is effective without the use of preheating flames.

Close behind the scarfing device, the welded tube travels through a sizing roll pass formed by rolls 50 and 51 that turn on axles 52, and that effect a substantial reduction in the diameter of the tube. This sizing pass immediately after the welding is made practical by the removal of the flash 42 in accordance with this invention.

Fig. 4 shows the forming and welding of a skelp 54 that is first heated by a furnace 55, or by a combination of the furnace and a local edge-heating device 56 beyond the furnace, to a temperature high enough for welding. The skelp is pulled through a stationary die or bell 57 held in a head block 58. The bell 57 brings the skelp edges together under pressure and molten metal on the surfaces of the edge faces is extruded as a flash 59 on the inside of the tube. There can be no flash on the outside of the weld because the bell 57 contacts with the tube material around the entire circumference of the welding tube.

The flash 59 is removed immediately after it forms by means of an oxygen jet from a scarfing device 60. This scarfing device preferably has a bearing surface that rests on the bottom of the tube as in the case of each of the devices shown in the other views of the drawing.

The scarfing device 60 is shaped to extend out through the entrance end of the bell 57 where it is connected with suitable supporting means and connected with a supply of oxygen (not shown).

The scarfing jets of this invention are directed against the flash perferably in the direction of the seam and at an angle of between 10° and 40° to the axis of the tube. The invention is not limited to the embodiments illustrated and terms of orientation are, of course, relative. For tubing formed with the seam at the top and an inside flash, for example, the position of the parts would be the same as Fig. 1 turned upside down. Scarfing devices can be used on both sides of the seam at the same time when the welding is under circumstances that produce flash both inside and out. When working with metal that is at a low temperature, preheating flames are associated with the scarfing jet. Other changes and modifications can be made and some features of the invention can be used without others without departing from the invention as defined in the claims.

I claim:

1. The combination with tube welding apparatus that welds progressively along the length of a continuously moving open-seam tube and produces a welded seam with a protruding flash, of seam-smoothing means including a device that projects an oxygen scarfing jet against the flash close behind the welding region and at a point where the metal of the seam is still above its kindling temperature.

2. Tube welding and smoothing apparatus comprising welding means that bring together the fused edge faces of the tube material and by forcing out some of the molten metal from between the edge faces produce a flash along the seam, and a smoothing device including a head through which opens a jet passage in position to direct an oxygen scarfing jet against the flash beyond the welding region and at a point where the metal of the seam is still above its kindling temperature.

3. The method of making flash-free, welded tubes which comprises limiting the flash to the inside of the tube at the time of welding by confining the edge portions of the tube material against outward displacement, and removing the flash immediately after its formation by projecting an oxygen scarfing jet against the flash from a position inside of the welded tube and at a point where the metal of the seam is still above its kindling temperature.

4. The method of making flash-free, welded tubes which comprises bringing the fused edge faces of a tube seam together in such a manner that the inner portions of the edge faces touch first and further closing together of the edges produces a flash that is on the outside of the tube, and removing the flash progressively beyond the welding region by directing an oxygen scarfing jet against the flash at a point where the metal of the seam is still above its kindling temperature.

5. The method of making flash-free, welded tubing which comprises bringing the fused edge faces of a seam together progressively along the length of the seam under sufficient pressure to produce a flash, and progressively removing the flash immediately after it forms by directing an oxygen scarfing jet against the flash close behind the region of welding and while the metal of the flash is still at a high temperature above the kindling point of the metal.

6. In the removal of flash from the seams of welded tubes, the improvement which comprises directing an oxygen scarfing jet against the flash beyond the region of welding and as a concurrent operation with the welding, the scarfing jet being directed against the flash at a point where the metal of the seam is still above its kindling temperature.

JAMES L. ANDERSON.